July 6, 1954  K. C. MELIKIAN ET AL  2,682,976
HOT BEVERAGE DISPENSING MACHINE
Filed Feb. 8, 1950  3 Sheets-Sheet 1

INVENTORS.
KHOREN C. MELIKIAN &
LLOYD K. RUDD
BY
ATTORNEY

July 6, 1954  K. C. MELIKIAN ET AL  2,682,976
HOT BEVERAGE DISPENSING MACHINE

Filed Feb. 8, 1950  3 Sheets-Sheet 3

INVENTORS.
KHOREN C. MELIKIAN &
LLOYD K. RUDD

BY

ATTORNEY

Patented July 6, 1954

2,682,976

UNITED STATES PATENT OFFICE 2,682,976

HOT BEVERAGE DISPENSING MACHINE

Khoren C. Melikian, Philadelphia, and Lloyd K. Rudd, Wayne, Pa., assignors to Rudd-Melikian Corporation, a corporation of Pennsylvania Application February 8, 1950, Serial No. 143,096

11 Claims. (Cl. 222—108)

This invention relates to machines for dispensing beverages and more particularly to a machine for dispensing hot beverages such as coffee and the like.

It is an object of our invention to provide a machine for dispensing a mixture of hot water and liquid coffee extract under controlled conditions and utilizing a solenoid valve combined in a unique manner with other elements for dispensing coffee extract.

It is another object of our invention to provide a machine having a high safety factor and suitable to automatic regulation.

It is a further object of our invention to provide a machine of rugged, simple and compact construction which lends itself to economical and convenient maintenance.

It is a still further object of our invention to provide a machine which requires little or no attention on the part of an operator, and which can be operated by simple push button controls.

In general, our machine comprises a hot water tank in which an electric heating element is immersed and wherein the water is constantly heated under thermostatic control. A novel drain arrangement permits expansion of the water as heating occurs, the tank being fed cold water under pressure by a solenoid valve under manual control in order to displace an equivalent amount of hot water which flows therefrom by gravity into a drinking receptacle. Pressure in the tank is atmospheric at all times owing to a novel venting system combined with the drain arrangement.

A system of automatic electrical control comprising various electrical components is utilized, wherein such components are housed in a casing mounted directly on the tank, and wherein a solenoid for a coffee extract valve is mounted within the casing so as to make a compact unit of almost all the electrical components of the machine.

A detailed description of our invention will now be given in conjunction with the appended drawing in which.

Figure 1:
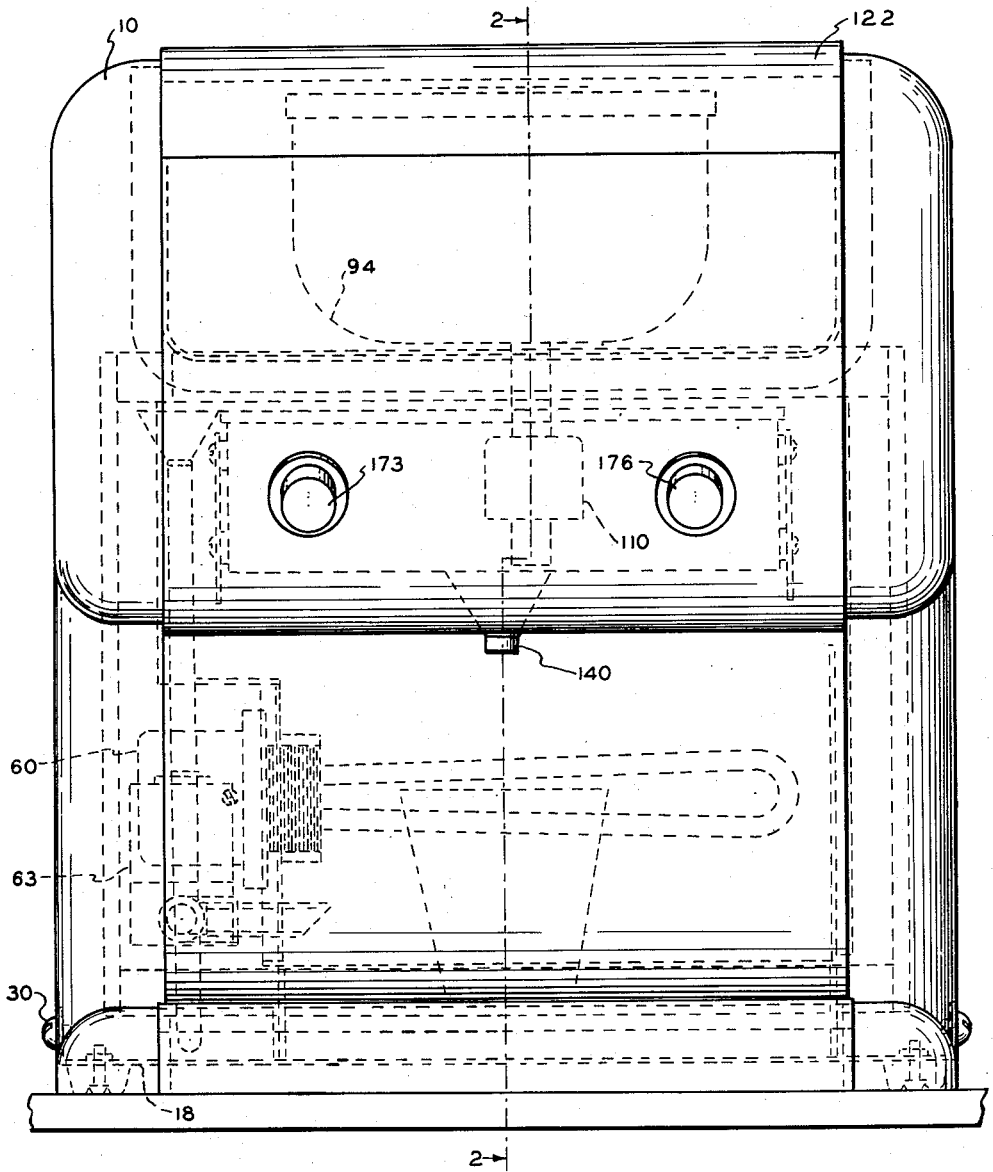
Figure 1 is a front view of the exterior of the machine.

With reference to the drawing, our machine comprises an outer rear shell 10, having a front plate 14, a base 18, and a cover plate 22. Shell 10 and base 18 are secured together by means of the upturned flange 24 on the base, as by a plurality of bolts 30.

Spaced inwardly from respective end flanges 24 (Figure 4) are flanges 34 and fastened to these are arcuately cut plates 37 which support a water tank 40 to which they are fastened. Forming part of the base 18 is a drain pan 43 and various guides for flexible tubing ends, such as 47 and 50. Ventilating holes 53 covered by a metal mesh 56 are provided in base 18. A drain platform 57 is pivotally attached to front plate 14 at 58 and for support of a receptacle or cup. An end of the water tank is recessed to accommodate a heater element 60, a soleoid operated water control valve 63 and a thermostatic control element 66, all for a purpose to be hereinafter described, said elements being mounted on the recessed wall 70 of the tank. Secured to the periphery of the tank is a vent collar 73, a spout 76 and spaced brackets 79.

Figure 2:
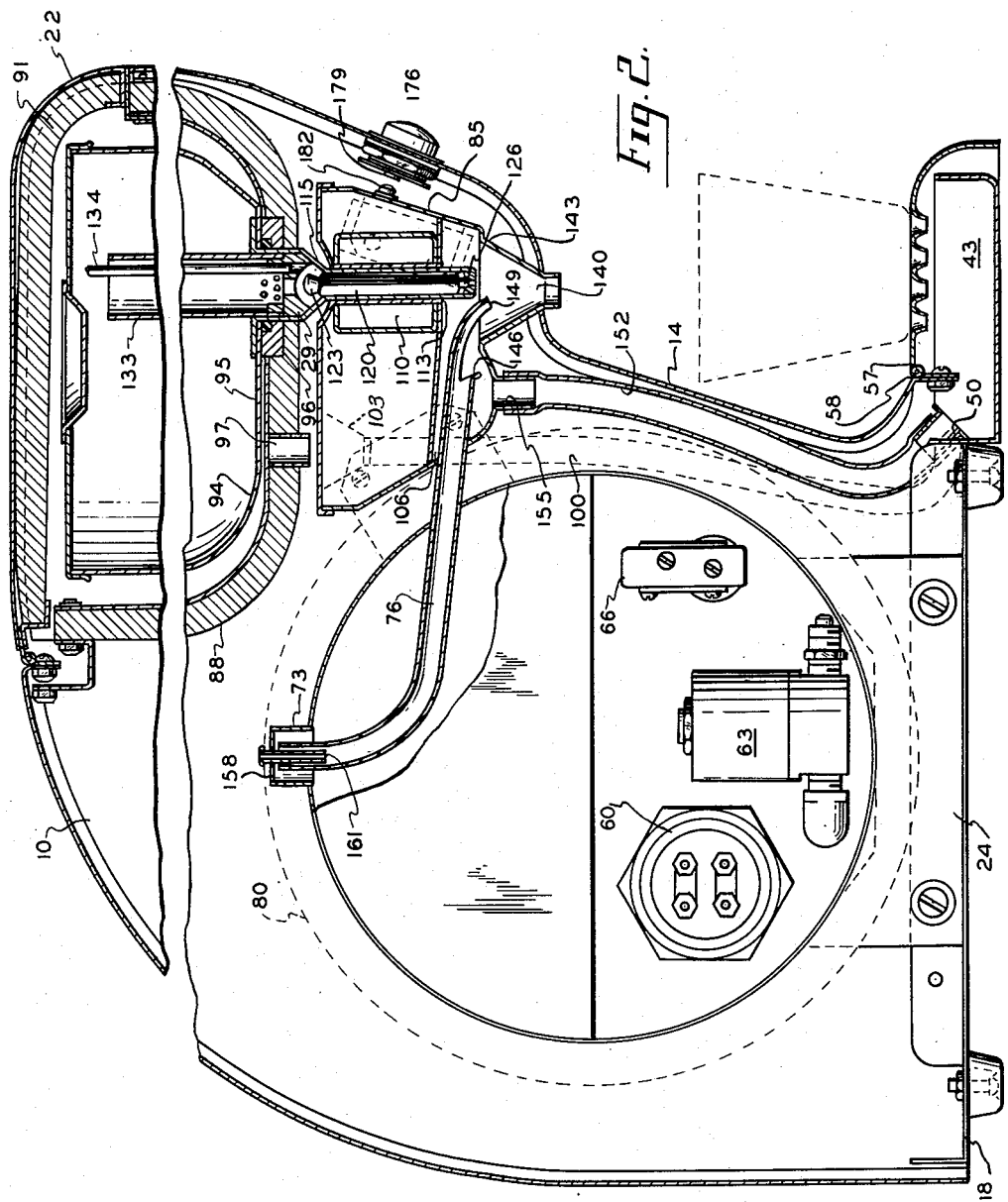
Figure 2 is a section taken through 2—2 of Figure 1.

As shown in phantom in Figure 2, a wrapper 80 of insulation surrounds the tank, which may be applied in any suitable manner.

Between the brackets 79 is secured an electrical control box 85 whilst secured above the box is an ice chest 88 suitably bolted to the housing members 10 and 14. Cover 22 carries an insulation panel 91 therein, as shown in Figure 2.

A coffee extract container 94 rests near the bottom of the ice chest on a gasket 95 which fits sealingly within a port 96 in the bottom of the chest and is attached thereto. It will be understood that the spacing around container 94 is utilized for a packing of chipped ice which upon melting drains through port 97 and a tube 100 shown in phantom, the end of which is secured in member 47 (Figure 4) into drain pan 43. It should be noted that tube 100 does not pass through box 85, but terminates in a funnel 103 at its upper end (Figure 2) disposed below port 97 and secured by soldering at both ends.

Figure 3:
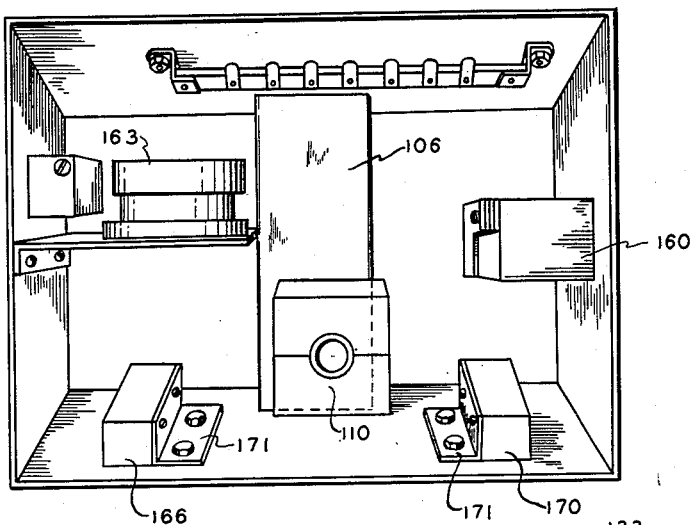
Figure 3 is a plan view looking down into the casing and showing the electrical components.
Figure 5:
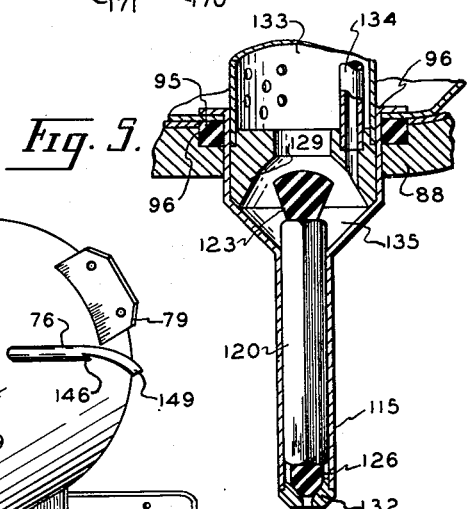
Figure 5 shows a fragmentary detail of the valve structure.

Box 85 houses a number of electrical components as shown in Figure 3, and is provided with a tunnel 106 through which spout 76 protrudes. The tunnel comprises an inverted metal channel welded sealingly to the side and bottom walls of the box so as to preclude any leakage thereinto. Secured on the tunnel is a solenoid coil having an open center disposed above an opening 113 in the top wall of the tunnel. A tube 115 is secured to container 94 and depends therefrom, protruding slidably into the center of the solenoid, whence it will be understood that container 94 and tube 115 may be removed from the machine as an integral unit. Carried slidably within the tube 115 is an armature 120 which is in reality a valve stem having upper and lower heads 123 and 126, respectively, alternately seatable against seats 129 and 132, respectively. Seat 129 is secured within tube 115 and a cylinder 133 having perforations near the bottom thereof is likewise secured to tube 115, and to seat 129, thus making an integral unit whereby cylinder 133 may be grasped to remove container 94 from the ice chest. A tube 134 is secured in seat 129 for venting chamber 135 when coffee extract is flowing therefrom.

Armature 120 is polygonal in cross-section, triangular preferably, so that fluid trapped in quantity predetermined by the volume of chamber 135 and the region around the armature body can flow down the sides when the armature is raised upon energization of the solenoid 110, to thus deliver a measured charge of coffee extract. The armature is normally maintained by its own weight against the lower seat.

A funnel 140 is secured to the base of box 85 within the confines of tunnel 106, a port 143 being provided in the bottom of the box so that spout 76 and tube 115 can empty into the funnel thereby mixing hot water and coffee extract therein for pouring into a receptacle standing on the drain platform.

*Tank and spout ventilating and drain system*

Figure 4:
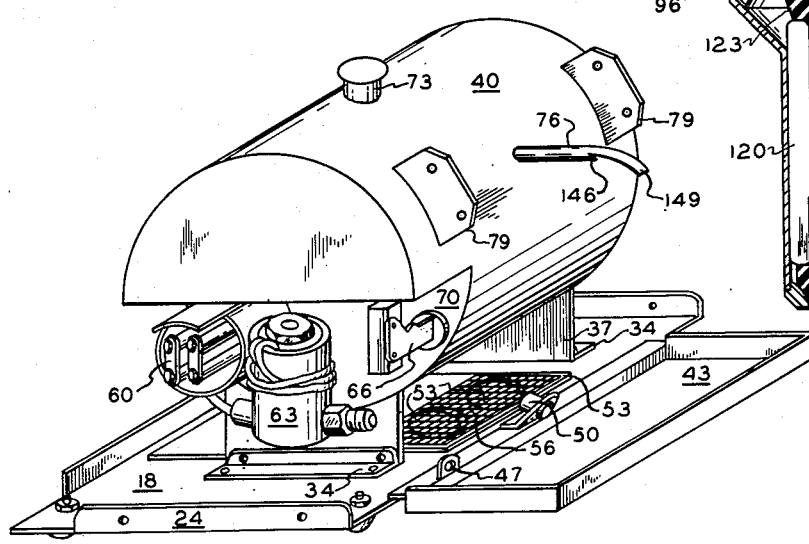
Figure 4 is a perspective of the water tank and base showing details of construction thereof.

With reference to Figures 2 and 4, it will be noted that spout 76 terminates in a lip 146 although the top portion of the tube extends to another lip 149 which is over funnel 140. Lip 146 is suitably disposed over a flexible drain tube 152 secured at its upper end to the bottom of box 85 by means of a nipple 155 and at its lower end it is secured in the nipple 50 over the drain pan 43. The upper end of spout 76 is disposed concentrically in the vent cap 73 which is closed at its top by a disc 158 having a perforate center in which a vent tube 161 is secured and which extends into the upper end of the spout, being spaced from the walls thereof. The purpose of this arrangement is to allow for drainage of hot water via spout 76 to tube 152 to compensate for expansion of the water being heated. Thus, no pressure is built up in the tank. Further, owing to the open passage in vent tube 161, spout 76 is constantly drained, so that there is no tendency for water in the spout to be retained. When water is being drawn from the tank (due to opening of solenoid valve 63 to force water in at the bottom as previously explained) the momentum of the moving column of water passing downwardly through the spout is sufficient to continue the flow past lip 146 as far as lip 149 where it is deflected into funnel 140. Thus no water is lost via the drain tube 152 when a receptacle is being filled. It is, of course, essential that valve 63 open to a sufficient degree to attain the required velocity in the spout. However, we have found the velocity required is not critical and that an ordinary convenient rate of discharge into a cup or glass without splashing therein is quite suitable.

*The electrical control structure*

As heretofore mentioned, most of the electrical components are housed in casing 85, in particular the solenoid 110 for the coffee valve. Other electrical components are: a relay 160, a timing mechanism 163, a hot water control microswitch 166, and a microswitch 170 which controls both the coffee and water valves to provide a mixture of these liquids in proper proportion. The microswitches are suitably carried by brackets 171 fastened to the front wall of casing 85.

The specific circuit for effecting these functions is substantially as disclosed in our co-pending application Serial No. 89,048 filed April 22, 1949; wherein reference is made to the present application. It should be noted that the water valve of the circuit shown in the co-pending application, although sometimes referred to therein as a hot water valve, is actually utilized for our purposes to control the cold water to the bottom of the tank; it is believed that control of the cold water in a tank having no internal pressure other than atmospheric has certain practical advantages particularly in combination with our drain and vent system.

The microswitches are actuated by respective push buttons 173 and 176 carried on front panel 14, each having a pin 179 engageable with a pin 182 of the respective switch, Figure 2.

It will be readily apparent to persons skilled in the art that the electrical components of this disclosure may be wired up to conform to the circuit shown in our co-opending application, all components being essentially as there symbolically disclosed, except that in the present instance we have chosen to eliminate the single pole double throw switch for providing flow of coffee extract alone, this being an optional feature which we do not regard as essential to the present case; obviously, conventional connections may replace this switch. Further, it will be apparent that the timing motor cycle must be sustained a sufficient period to permit complete emptying of the predetermined charge of coffee extract within tube 115.

The hook-up of the heating element 60 and thermostat 66 is of a generally conventional nature, although the mechanical combination with the recessed tank we believe to be novel.

In view of the detailed description hereinabove given, and further in view of our co-pending application, it appears that the operation of this machine need not be further amplified. We particularly wish to point out that the present disclosure is drawn to contain specific features such as a compact arrangement of many electrical elements, primarily brought about by the recessed tank and the mounting of the electrical box on the front of the tank, as well as the novel mounting of the ice chest and mode of support of the coffee container whereby it is readily removable for cleansing. In addition, the venting and drainage elements per se and also as co-acting in space arrangement with the electrical control box are an important aspect of our invention. Finally, the shell construction making all parts readily accessible is believed to be novel; and although we show a specific embodiment of all the above features we believe the invention to be broader than the particular illustration and accordingly do not seek to be limited thereto except as set forth in the appended claims.

We claim:

1. A beverage dispensing machine comprising a water tank and an electrical control box, said box being mounted on said tank, a beverage reservoir mounted above said box, a wall of said box having an opening disposed below said beverage reservoir, a solenoid coil within said box in alignment with said opening and another wall of said box comprising an opening in alignment with said first opening, a valve carried by said beverage reservoir including an armature actuatable by said solenoid, and electrical control means within said box for energizing and deenergizing said solenoid coil.

2. In a machine as set forth in claim 1, including a funnel secured to the bottom of said electrical control box below said solenoid coil, and an outlet duct for water emptying into said funnel, said outlet duct communicating with said water tank.

3. In a machine as set forth in claim 1, wherein said valve comprises a casing carried by and depending from said beverage reservoir, said solenoid coil being concentric with and slidably related to said valve casing and separable therefrom and carried by said electrical control box, said armature being within said valve casing, said reservoir being removable integrally with said valve casing from said machine.

4. The combination of a container comprising a liquid reservoir having an outlet, a valve casing carried by said container communicating with said outlet, and extending outwardly from said container, said casing having a valve seat therein, an armature slidable in said valve casing, a valve head actuable by said armature, a base, means for removably supporting said container on said base, and a solenoid coil carried by said base and having an opening into which said valve casing is adapted to protrude when said container is resting on said base.

5. A machine for dispensing hot beverages comprising a base, and a hot water tank supported thereon, including means for introducing cold water into said tank and for heating the water within said tank, outlet means from said tank, a beverage delivery funnel toward which said outlet means is directed, the outlet means from said water tank comprising an outlet tube having an inner end protruding into said tank and above the normal water level therein and having an outer end terminating predeterminedly short of said funnel but at a higher level than the top thereof, and a drain tube disposed below said outer end of said water outlet tube whereby a flow of cold water into said tank is operative to effect flow of hot water through said outlet tube to said funnel and whereby expansion of water in said tank effects drainage through said tube to said drain tube.

6. A machine as set forth in claim 5, including a housing surrounding said water tank and concealing said drain tube and an opening in said housing through which the lower end of said funnel protrudes.

7. A machine as set forth in claim 5, wherein a portion of the outer end of said outlet tube is longitudinally extended for a portion of its periphery to form a baffle for directing water flow into said funnel.

8. A beverage dispensing machine comprising a liquid storage tank, an outlet tube having an open outlet and exteriorly of said tank, said tube protruding into a wall of said tank and being formed with an inlet end adapted to extend upwardly therein to a point above the normal static liquid level, said inner end being open to the interior of said tank, and a vent tube protruding through a wall of said tank and extending into the inlet end of said outlet tube and being spaced from the walls thereof.

9. A beverage dispensing machine comprising a base, a water tank supported on said base, an electrical control box supported on said water tank, a housing surrounding said tank and box, an ice chest above said box and supported by said housing, a beverage reservoir in said chest and removably supported thereby, said box having aligned upper and lower openings, a solenoid coil mounted in said box and having an open center aligned with said openings, and a valve casing carried by said reservoir exteriorly thereof and protruding into said solenoid coil when said reservoir is resting in said ice chest.

10. A machine as set forth in claim 9, including push button switch means carried by and protruding from said electrical control box and respective plunger means carried by said housing and engageable with said push button means for operation thereof.

11. A machine for dispensing hot beverages comprising a base and a hot water tank supported thereon, including means for introducing cold water into said tank and for heating the water within said tank, outlet means from said tank, a beverage delivery funnel toward which said outlet means is directed, the outlet means from said water tank comprising an outlet tube having an inner end protruding into said tank and above the normal water level therein and having an outer end terminating predeterminedly short of said funnel but at a higher level than the top thereof, and a drain tube disposed below said outer end of said water outlet tube whereby a flow of cold water into said tank is operative to effect flow of hot water through said outlet tube to said funnel and whereby expansion of water in said tank effects drainage through said tube to said drain tube, and a vent tube protruding through a wall of said tank and extending into the inlet end of said outlet tube and being spaced from the walls thereof.

References Cited in the file of this patent

UNITED STATES PATENTS

| Number | Name | Date |
|---|---|---|
| 326,940 | Brown | Sept. 29, 1885 |
| 781,828 | Jenson | Feb. 7, 1905 |
| 2,433,977 | Bently | Jan. 6, 1948 |